Jan. 7, 1930.  H. H. COLLINS  1,742,636
VEHICLE PARKING MECHANISM
Filed Jan. 5, 1927   4 Sheets-Sheet 1
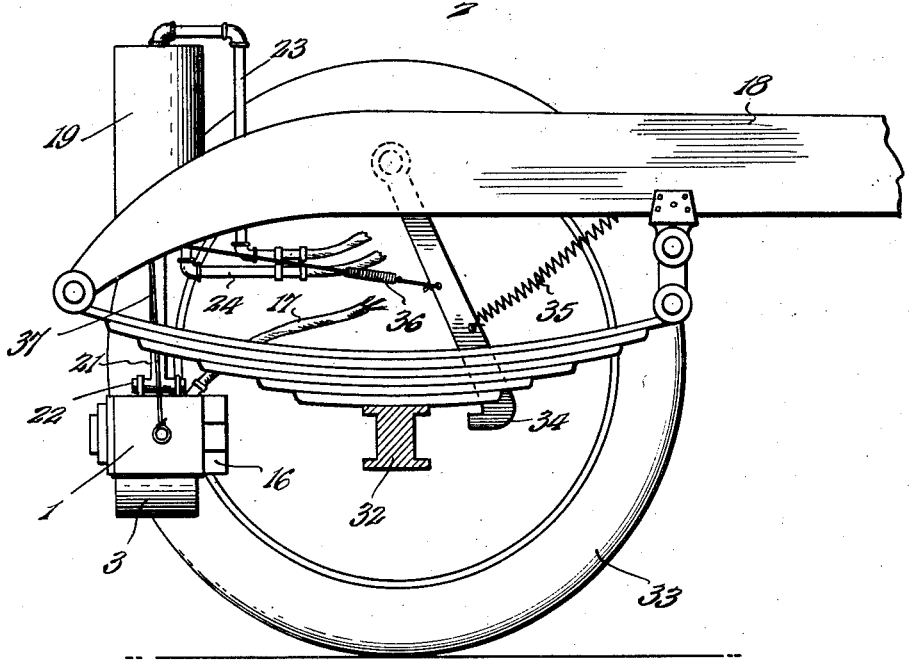
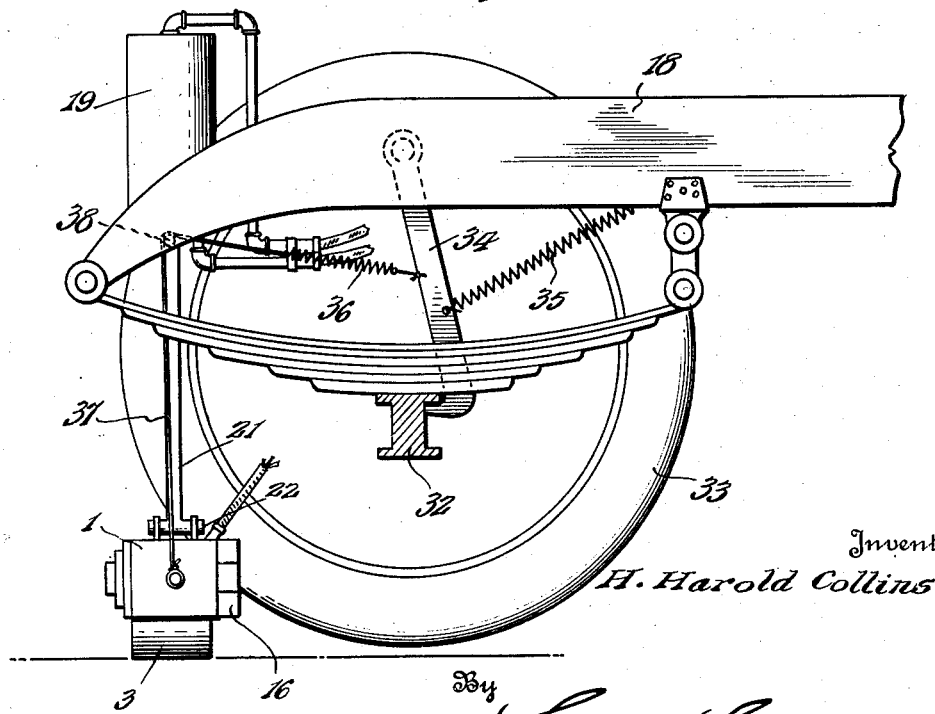

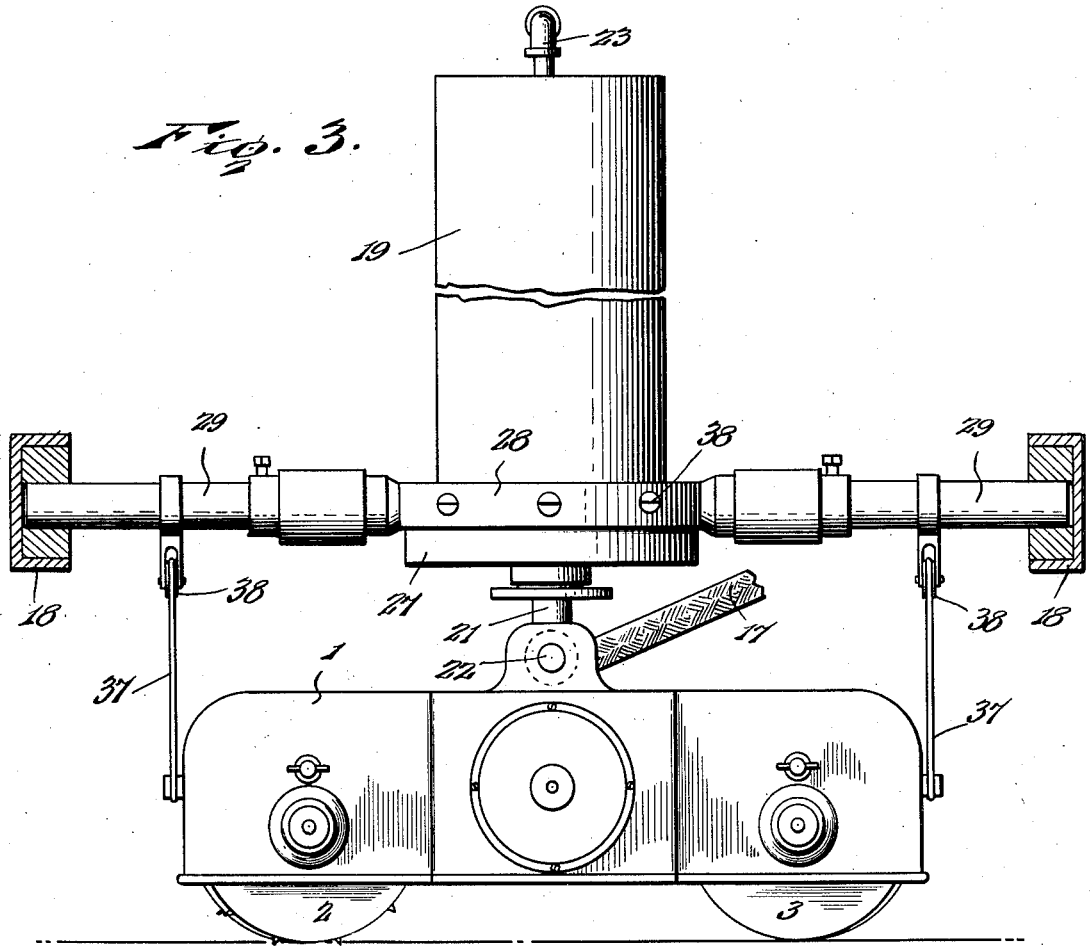

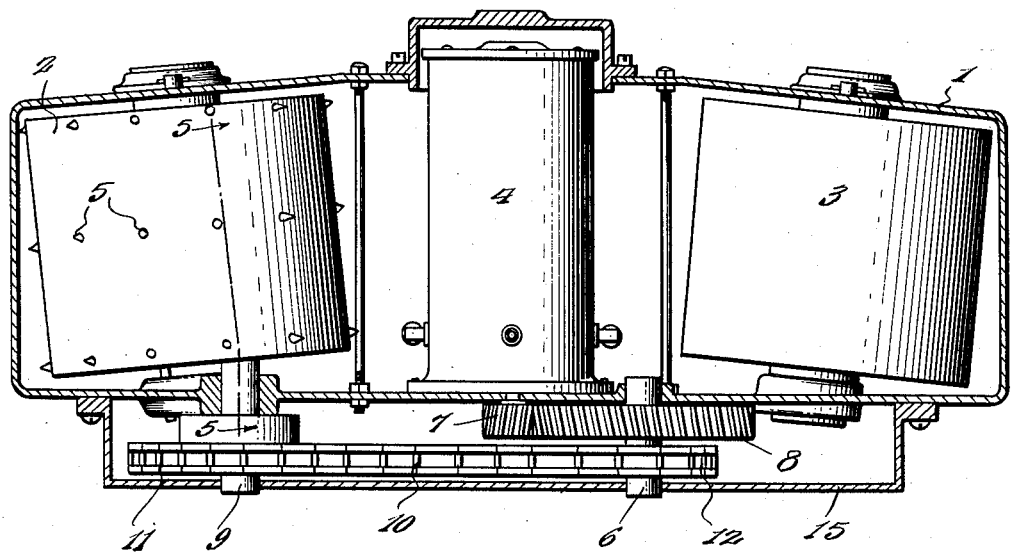
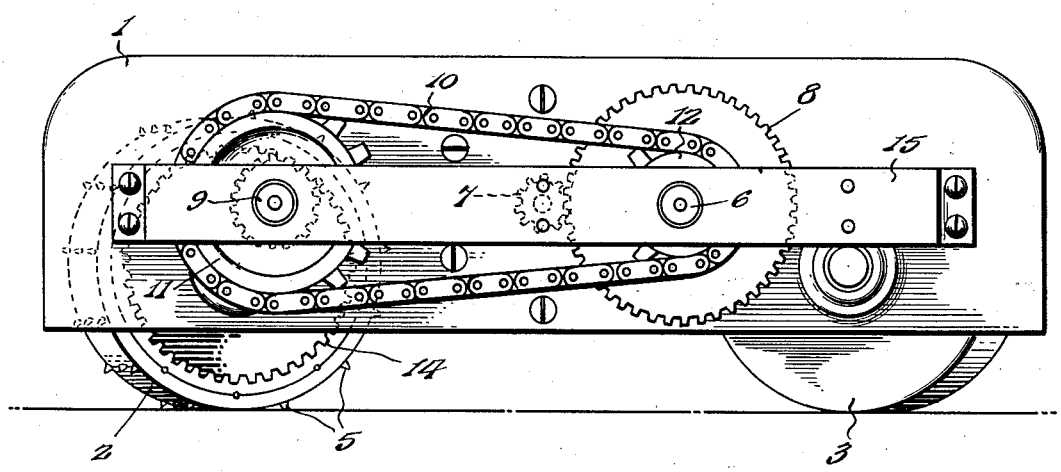
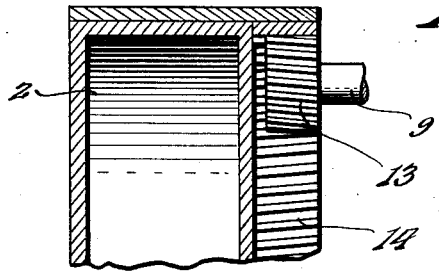

Jan. 7, 1930. H. H. COLLINS 1,742,636
VEHICLE PARKING MECHANISM
Filed Jan. 5, 1927 4 Sheets-Sheet 4
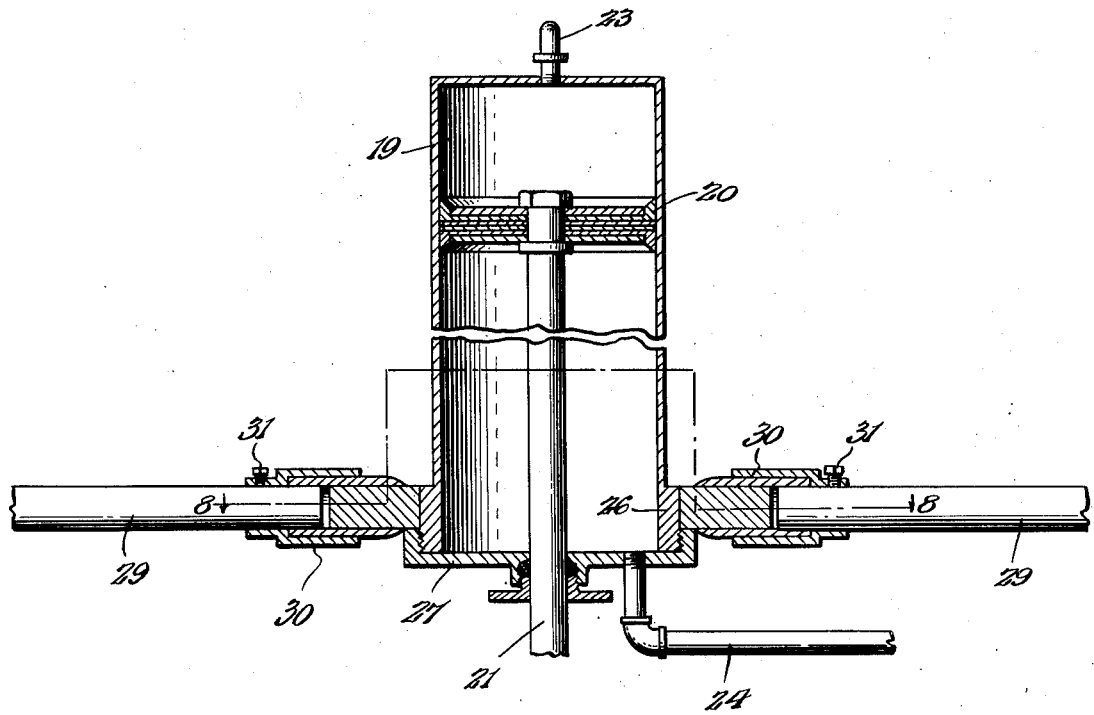
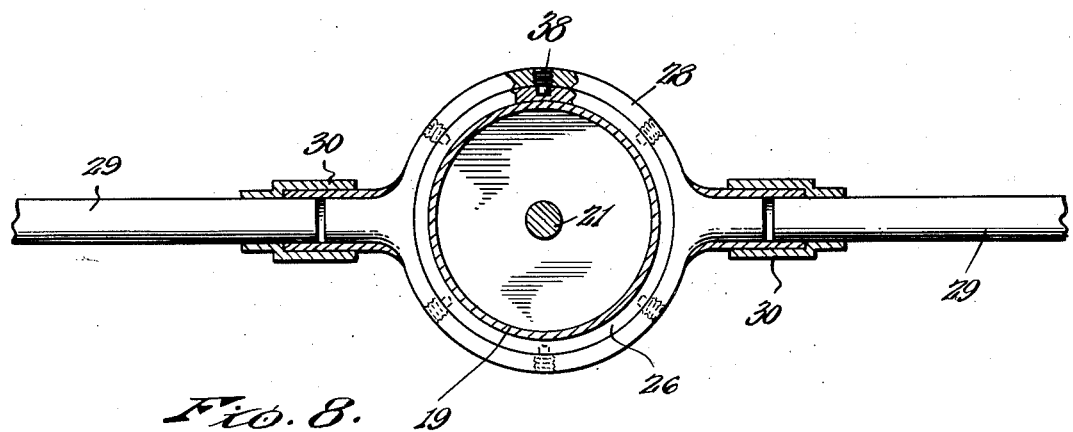
Inventor
H. Harold Collins.
By Lacey & Lacey, Attorneys Patented Jan. 7, 1930

1,742,636

UNITED STATES PATENT OFFICE

HIRAM HAROLD COLLINS, OF CINCINNATI, OHIO, ASSIGNOR TO BROOKS WALKER, OF PIEDMONT, CALIFORNIA

VEHICLE PARKING MECHANISM

Application filed January 5, 1927. Serial No. 159,161.

In congested districts, where space for parking automobiles is at a premium, considerable difficulty is experienced by the average driver of a motor vehicle to land it close to the curb, as required by municipal regulation. In some instances spaces exist but it is practically impossible to park an automobile therein because of the room required for manipulation of the machine to land it close to the curb.

The present invention provides a mechanism mounted upon an end portion of an automobile which admits of lateral movement of such end to carry it towards or away from the curb after the opposite end of the vehicle has been run close to the curb, thereby admitting of the parking of an automobile in a space a trifle in excess of the length of the machine.

The invention contemplates a tractor unit for moving the vehicle laterally and an elevator unit for raising and lowering the tractor unit, where in the ordinary use of the vehicle the tractor unit is out of the way and when it is required to park in a restricted space the tractor unit is lowered into operative position for moving the vehicle laterally, towards or away from the curb.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof reference is to be had to the following description and the drawings hereto attached, in which—

Figure 1 is a side view of a parking mechanism as it appears when installed and the tractor unit elevated.

Figure 2 is a view similar to Figure 1, with the tractor unit in lowered position, and the axle locked to the frame of the chassis to prevent a spreading of such parts.

Figure 3 is a front view of the parking mechanism showing the parts on a larger scale.

Figure 4 is a top plan view of the tractor unit, the frame thereof being in horizontal section.

Figure 5 is a rear elevational view of the tractor unit, the cap covering the transmission gearing being omitted.

Figure 6 is a fragmentary sectional view on the line 6—6 of Figure 4.

Figure 7 is a detail sectional view of the elevator unit.

Figure 8 is a horizontal sectional view on the line 8—8 of Figure 7, parts of the cylinder flange and cylinder band being broken away, and Figure 9 is a sectional detail of the four-way valve for controlling the motive medium of the elevator unit.

Corresponding and like parts are referred to in the following description and designated in the several views of the drawings by like reference characters.

The tractor unit comprises a suitable frame 1, rollers 2 and 3 and a motor 4. One of the rollers, as 2, is connected to the shaft of the motor 4 by a suitable transmission and to preclude slipping, the roller 2 is studded with teeth or projections 5 to insure positive traction on an ice covered surface. The tractor unit is disposed transversely of the automobile, or other motor driven vehicle, and is located at the end thereof, preferably the front. The axes of the rollers 2 and 3 diverge forwardly to insure the best results, since the end of the vehicle equipped with the tractor unit travels in an arcuate path. While any type of motor 4 may be employed, it is preferred to utilize a motor of the electric variety and wound for reverse movement, so that the vehicle may be moved laterally towards the curb or away therefrom. A short shaft 6 is connected to the shaft of the motor by gear elements 7 and 8 and this shaft is connected to a shaft 9 by means of a sprocket chain 10 and sprocket wheels 11 and 12 fast to the respective shafts 9 and 6. A pinion 13 fast to the inner end of the shaft 9 is in mesh with a ring gear 14 fast to an end of the roller 2 for imparting positive movement thereto.

A bar 15 is attached to the rear side of the frame 1 and receives the outer ends of the shafts 6 and 9. A cap 16 attached to the bar 15 encloses the transmission between the motor and the drive roller 2. Current is supplied to the motor 4 from a suitable source of supply, such as a storage battery, by means of a cable 17, it being understood that a switch of any approved type is interposed in the length of the cable for controlling the current.

The elevator unit is mounted upon the side bars 18 of the chassis frame, and as shown, comprises a cylinder 19 and a piston 20 therein. The pinion rod 21 passes through a packing gland at the lower end of the cylinder and is pivotally connected at its lower end to the frame 1 of the tractor unit, as indicated at 22. This provides for a tilting of the tractor unit to adapt itself to the road surface so that the weight may be distributed upon the rollers 2 and 3. A pipe 23 connects with the upper end of the cylinder 19 and a similar pipe 24 connects with the lower end of the cylinder. The pipes 23 and 24 connect with a suitable source of supply of motive medium, such as compressed air, and both pipes connect with a four-way valve 25 whereby the supply of motive medium to the cylinder 19 is controlled for positive movement of the piston 20, either to elevate or lower the tractor unit, as required. The controlling valve 25 may be conveniently located in any advantageous position, as well as the tank containing the compressed air. A reinforcing flange 26 is provided at the lower end of the cylinder 19 and the cap 27 closing the lower end of the cylinder is threaded thereto. The supporting means for the elevator unit includes a cylinder band 28 which snugly fits the flange 26 and arms 29 which are supported at their outer ends in the side bars 18 of the main frame. Sockets 30 project from the cylinder band 28 at diametrically opposite points and receive the inner ends of the arms 29 which are retained in place by clamp screws 31 threaded into openings formed in the outer ends of the sockets 30. In this manner provision is had for mounting and dismounting the elevator unit as required.

Locking means are provided for preventing spreading or separation of the axle 32 and the main frame when the tractor unit is lowered into operative position to lift the front wheels 33 of the vehicle from the ground preliminary to moving the vehicle laterally. The locking means includes a catch 34 which is pivoted to the main frame at its upper end and adapted to engage the axle 32 at its lower end, as indicated most clearly in Figure 2. A catch 34 is provided at each side of the vehicle. A contractile spring 35 connects each of the catches 34 with the main frame and normally tends to hold the catch clear of the axle, as indicated most clearly in Figure 1. When the tractor unit is lowered into operative position, the tension of the springs 35 is overcome and the catches 34 are drawn into engagement with the axle 32, as indicated in Figure 2. This is effected by means of a contractile spring 36, and a cord 37, the latter being attached to an end of the frame 1, and the spring 36 connected to a catch 34. The cord 37 passes over a guide pulley 38 suspended from an arm 29 and is connected to the forward end of the spring 36. It is observed that a spring 36 and cord 37 are provided for each of the catches 34 and for each end of the frame 1, as indicated most clearly in Figure 3. As the tractor unit is lowered the springs 36 are tensioned and overcome the tension of the springs 35, thereby drawing the catches 34 into engagement with the axle 32. This result is obtained when the tractor unit reaches an operative position, thereby preventing a lowering of the axle 32 when the wheels 33 are lifted from the ground by the elevating force applied to the main frame, the latter and the axle being lifted to prevent drag of the wheels 33 when the vehicle is moved laterally towards or away from the curb. When the tractor unit is elevated the springs 36 assume a normal position and the springs 35 come into play to withdraw the catches 34 from engagement with the axle 32, as indicated in Figure 1.

It being assumed that the mechanism is installed upon the front end of an automobile substantially as indicated in Figure 1, and when it is required to park the vehicle in a space slightly in excess of the length of the vehicle, the latter is backed into the space to a position as close as possible to the curb. The valve 25 is now operated to admit compressed air, or other medium into the upper end of the cylinder 19, thereby moving the piston 20 downward and lowering the tractor unit into operative position. As the tractor unit approaches its lowermost position, the springs 36 are tensioned to overcome the tension of the springs 35 so as to draw the catches 34 into engagement with the axle 32 and when the lifting force is applied to the main frame 18, the axle being locked thereto through the catches 34, is likewise lifted, to cause the wheels 33 to clear the surface of the roadway, so as not to drag thereon when the vehicle is moved laterally towards the curb, when the motor 4 is actuated. When it is required to depart the motive medium is supplied to the cylinder 19, to cause the piston 20 to move upwardly, thereby elevating the tractor unit. This takes place after the front end of the vehicle has been moved laterally from the curb by energizing the motor 4. As the tractor unit rises, the catches 34 are automatically disengaged from the axle 32 by means of the springs 35 in the manner herein stated. The cylinder band 28 is retained in place by countersunk screws 38 threaded into openings formed therein, the inner ends of the screws being reduced and entering openings formed in the cylinder flange 26, as shown most clearly in Figure 8.

Having thus described the invention, I claim:

1. In combination with a motor vehicle, a centrally disposed elevator unit comprising a vertical cylinder having an outer reinforcing flange at its lower end, a piston in the cylinder, a tractor unit connected with the piston, a cylinder band fitted to the reinforcing flange and having sockets at opposite points, and arms secured in the sockets and mounted at their outer ends in the side bars of the main frame.

2. In combination with a motor vehicle, a centrally disposed cylinder, a piston therein, a tractor unit pivotally connected with the piston rod and movable vertically therewith, supply and exhaust pipes connected with opposite ends of the cylinder, a four way valve having the supply and exhaust pipes connected thereto, locking means between the main frame and axle of the vehicle, a spring normally holding the locking means out of action, and a supplementary spring tensioned when the tractor unit is lowered to draw the locking means into operative position.

In testimony whereof I affix my signature.

HIRAM HAROLD COLLINS. [L. S.]